US011095924B1

(12) United States Patent
Chee et al.

(10) Patent No.: US 11,095,924 B1
(45) Date of Patent: Aug. 17, 2021

(54) METHOD AND DEVICE FOR PROVIDING A TIME-COMPRESSED PREVIEW OF A PRE-BUFFERED VIDEO DURING A PUSH-TO-VIDEO COMMUNICATION SESSION

(71) Applicant: MOTOROLA SOLUTIONS, INC., Chicago, IL (US)

(72) Inventors: Chong Hin Chee, Gelugor (MY); Wei Lun Chan, Simpang Ampat (MY); Bijun Leong, Ayer Itam (MY); Chong Keat Chua, Ayer Itam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/885,701

(22) Filed: May 28, 2020

(51) Int. Cl.
| | |
|---|---|
| *H04N 21/234* | (2011.01) |
| *H04W 4/10* | (2009.01) |
| *H04N 21/845* | (2011.01) |
| *H04N 21/242* | (2011.01) |
| *H04N 21/8549* | (2011.01) |
| *H04N 21/2187* | (2011.01) |

(52) U.S. Cl.
CPC ... *H04N 21/23406* (2013.01); *H04N 21/2187* (2013.01); *H04N 21/23418* (2013.01); *H04N 21/242* (2013.01); *H04N 21/8456* (2013.01); *H04N 21/8549* (2013.01); *H04W 4/10* (2013.01)

(58) Field of Classification Search
CPC ......... H04N 21/23406; H04N 21/2187; H04N 21/23418; H04N 21/242; H04N 21/8456; H04N 21/8549; H04N 21/234; H04N 21/2343; H04N 21/234345; H04N 21/234381; H04N 21/2401; H04N 21/44004; H04N 21/23412; H04N 21/44008; H04W 4/20
See application file for complete search history.

(56) References Cited

U.S. PATENT DOCUMENTS

| | | | |
|---|---|---|---|
| 9,609,380 B2 | 3/2017 | Laska et al. | |
| 10,785,511 B1* | 9/2020 | Lopez Hernandez | ....................... G06K 9/00711 |
| 2015/0302894 A1 | 10/2015 | Boiman et al. | |
| 2017/0195563 A1 | 7/2017 | Ribeiro et al. | |
| 2019/0020827 A1* | 1/2019 | Siminoff | ................ H04N 7/186 |
| 2019/0156126 A1* | 5/2019 | Laska | ................ H04N 21/4316 |
| 2019/0303164 A1* | 10/2019 | King | .................... G06F 9/3855 |

FOREIGN PATENT DOCUMENTS

WO        2014031834 A1    2/2014

* cited by examiner

*Primary Examiner* — Alexander Gee
(74) *Attorney, Agent, or Firm* — Raguraman Kumaresan

(57) ABSTRACT

A process for providing a time-compressed preview of a pre-buffered video during a push-to-video (PTV) communication session. A video communication device detects a PTV activation command and analyzes a pre-buffered video to detect objects of interest. The video communication device then establishes a PTV communication session with a second video communication device to transmit a time-compressed preview of the pre-buffered video in which some of the video segments in which the objects of interest appear are configured for accelerated playback at the second video communication device. The video communication device transmits a live PTV stream for synchronous playback at the second video communication device only after the transmission of the time-compressed preview of the pre-buffered video is completed.

20 Claims, 6 Drawing Sheets

METHOD AND DEVICE FOR PROVIDING A TIME-COMPRESSED PREVIEW OF A PRE-BUFFERED VIDEO DURING A PUSH-TO-VIDEO COMMUNICATION SESSION

BACKGROUND

Video has emerged as a critical medium for communication and collaboration among users. Public safety agencies have begun to use communication technologies that allow officers to capture and share live video from their devices instantly to other officers in a particular group. Officers in the group may be required to watch the live video and make decisions in real-time on how to respond to an emergency situation captured in the live video.

As an example, assume an officer with a camera sees a person hit by a speeding vehicle. In this situation, the officer may make use of a body-worn camera to stream live video of the incident to other officers in his group. However, by the time the officer activates the camera to begin the live video streaming, it is possible that the vehicle which hit the person might have disappeared from the field-of-view of the officer's camera or alternatively the vehicle might have converged with other vehicles passing through the road. So, while the live video stream may capture a visual of the person that was hit by the vehicle, it is possible the live video stream did not capture the particular moment the person was hit by the vehicle. In this case, recipients of the live video stream may not be able to readily extract enough information about the incident or identify the vehicle which caused the incident. As another example, a live video stream may include a visual of the suspect, but may not include the moment at which the suspect displayed a firearm before concealing it. Therefore, in such cases, a live video stream that does not capture pertinent information needed to extract the context of an incident may be confusing to the recipient of the video or even cause difficulty with respect to making real-time decisions to respond to the incident.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
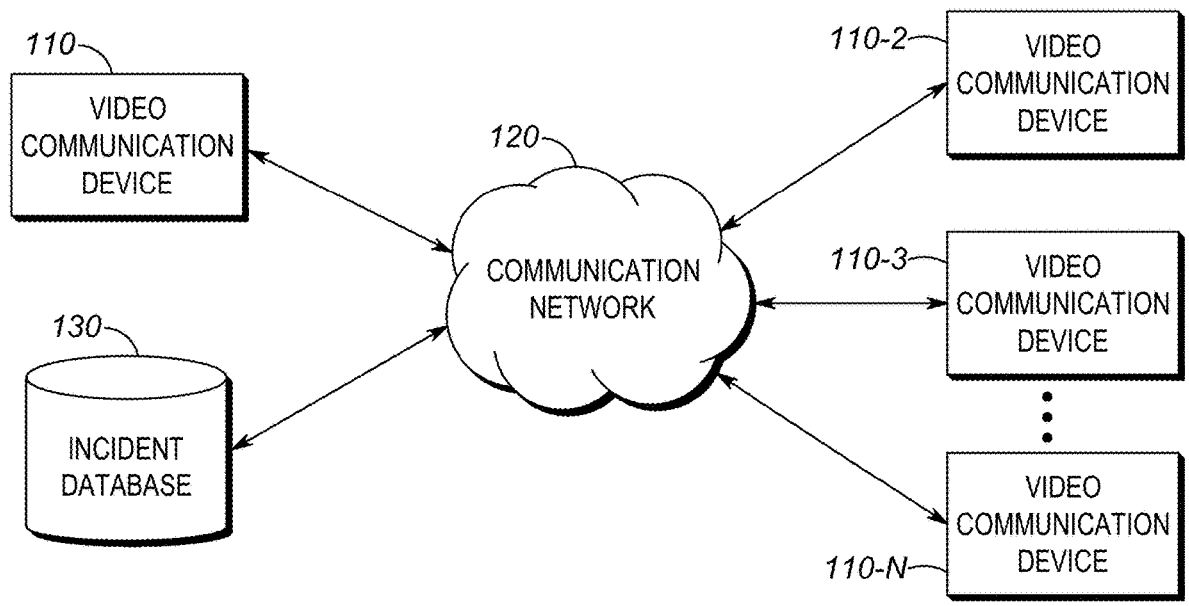
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, it can be confusing or difficult for a recipient of a live video stream to readily extract the context of an incident captured in a live video stream. A pre-buffer function can be enabled in cameras to continuously capture and store video for a length of time according to a size of a pre-buffer even while the camera was not manually activated for recording by the user. When the pre-buffer function is enabled, the camera continuously captures and re-writes the video stored in the pre-buffer with a most recent video. The pre-buffer may be implemented at a device memory using a circular buffer data structure. The video that is continuously captured and stored in the pre-buffer is referred to as a pre-buffered video. To overcome the difficulty associated with understanding an incident context from the live video stream, pre-buffered video could be sent along with the live video stream to the recipient. However, in some cases, even pre-buffered video may not provide better understanding of the incident context especially if the camera was in the pocket, resulting in a pre-buffered video that was blank or blurred or if the pre-buffered video did not really capture any footage from which the recipient would be able to extract incident context. In addition, transmitting the pre-buffered video before the live video stream may result in a playback at the recipient's devices that is not entirely synchronous with the visuals currently being captured at the camera. In other words, playback of the live video stream at the recipient's devices may be continuously delayed for at least a length of time needed to playback the pre-buffered video. This may cause some confusion especially if the officer sending the live video stream is also talking in real-time about the events of the live video stream on a separate radio device. In this case, the recipients may be looking at a visual during playback of the pre-buffered video portion that is different from the one that is being captured in real-time by the sender's camera. These challenges can be overcome in accordance with the embodiments of the disclosure that provides a method of providing a time-compressed preview of a pre-buffered video during a push-to-video (PTV) communication session.

One embodiment provides a method of providing a time-compressed preview of a pre-buffered video during a push-to-video (PTV) communication session. The method includes: detecting, at a video communication device, a PTV activation command; analyzing, at the video communication device, a pre-buffered video to detect one or more objects of interest, the pre-buffered video representing a most recent video that was recorded at the video communication device for a predetermined time duration immediately preceding the detection of the PTV activation command; selecting, at the video communication device, from the pre-buffered video, a first set of video segments including a video segment in which the objects of interest appear within the pre-buffered video; time-compressing, at the video communication device, the pre-buffered video to generate a time-compressed preview of the pre-buffered video including the first set of video segments configured to be played at a first playback speed rate and a second set of video segments configured to be played at a second playback speed rate, the second set of video segments including video segments from the pre-buffered video other than the first set of video segments, wherein the second playback speed rate is greater than the first playback speed rate; establishing, at the video communication device, in response to the PTV activation command, a PTV communication session with at least one other video communication device, and responsively transmitting, during the PTV communication session, the time-compressed preview of the pre-buffered video while simultaneously buffering PTV stream captured at the video communication device between a time at which the PTV activation command was detected and a time at which transmission of a live PTV stream for synchronous playback at the at least one other video communication device is to be commenced; and determining, at the video communication device, that the transmission of the time-compressed preview of the pre-buffered video is completed, and responsively transmitting the buffered PTV stream to the at least one other video communication device during the PTV communication session; and determining, at the video communication device, that the transmission of the buffered PTV stream is completed, and responsively transmitting a live PTV stream to the at least one other video communication device during the PTV communication session for synchronous playback of the live PTV stream at the at least one other video communication device.

Another embodiment provides a video communication device including a memory, a transceiver, and an electronic processor communicatively coupled to the memory and the transceiver. The electronic processor is configured to: detect a PTV activation command; analyze the pre-buffered video to detect one or more objects of interest, the pre-buffered video representing a most recent video that was recorded at the video communication device for a predetermined time duration immediately preceding the detection of the PTV activation command; select a first set of video segments including a video segment in which the objects of interest appear within the pre-buffered video; time-compress the pre-buffered video to generate a time-compressed preview of the pre-buffered video including the first set of video segments configured to be played at a first playback speed rate and a second set of video segments configured to be played at a second playback speed rate, the second set of video segments including video segments from the pre-buffered video other than the first set of video segments, wherein the second playback speed rate is greater than the first playback speed rate; establish, in response to the PTV activation command, a PTV communication session with at least one other video communication device, and responsively transmit, via the transceiver, during the PTV communication session, the time-compressed preview of the pre-buffered video while simultaneously buffering PTV stream captured at the video communication device between a time at which the PTV activation command was detected and a time at which transmission of a live PTV stream for synchronous playback at the at least one other video communication device is to be commenced; and determine that the transmission of the time-compressed preview of the pre-buffered video is completed, and responsively transmit, via the transceiver, the buffered PTV stream to the at least one other video communication device during the PTV communication session; and determine that the transmission of the buffered PTV stream is completed, and responsively transmit, via the transceiver, a live PTV stream to the at least one other video communication device during the PTV communication session for synchronous playback of the live PTV stream at the at least one other video communication device.

Yet another embodiment provides a method of providing a time-compressed preview of a pre-buffered video during a push-to-video (PTV) communication session. The method includes: receiving, at a second video communication device, during a PTV communication session with a first video communication device, a first video stream representing a pre-buffered video and a second video stream representing a live PTV stream, wherein the pre-buffered video represents a most recent video that was recorded at the first video communication device for a predetermined time duration immediately preceding a detection of a PTV activation command at the first video communication device; analyzing, at the second video communication device, the pre-buffered video to detect one or more objects of interest; selecting, at the second video communication device, from the pre-buffered video, a first set of video segments including a video segment in which the objects of interest appeared within the pre-buffered video; time-compressing, at the second video communication device, the pre-buffered video to generate a time-compressed preview of the pre-buffered video including the first set of video segments configured to be played at a first playback speed rate and a second set of video segments configured to be played at a second playback speed rate, the second set of video segments including one or more video segments from the pre-buffered video other than the first set of video segments, wherein the second playback speed rate is greater than the first playback speed rate; playing, at the second video communication device, the time-compressed preview of the pre-buffered video while simultaneously buffering the received live PTV stream until a time at which the synchronous playback of the live PTV stream received from the first video communication device during the PTV communication device should be commenced at the second video communication device; determining that the playback of the time-compressed preview of the pre-buffered video is completed, and responsively playing, at the second video communication device, a time-compressed version of the buffered live PTV stream; and determining that the playback of the time-compressed version of the buffered live PTV stream is completed, and responsively synchronously playing, at the second video communication device, a live PTV stream received from the first video communication device.

Each of the above-mentioned embodiments will be discussed in more detail below, starting with example system and device architectures of the system in which the embodiments may be practiced, followed by an illustration of processing blocks for achieving an improved technical method, device, and system for providing a time-compressed preview of a pre-buffered video during a push-to-video (PTV) communication session. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system diagram illustrates a push-to-video (PTV) communication system 100 including a plurality of video communication devices 110-1, 110-2, 110-3, . . . 110-N communicatively coupled to each other via a communication network 120. The plurality of video communication devices 110-1, 110-2, 110-3, . . . 110-N can be interchangeably referred to, collectively, as video communication devices 110, and generically as a video communication device 110. Each video communication device 110 may be operated by a respective user (e.g., a public safety officer) who may carry or wear the respective video communication device. The video communication device 110 may take the form of a mobile phone or a portable two-way radio, a computer tablet, a laptop, a vehicular communication device, or a portable camera such as a body-worn camera. In accordance with embodiments, each video communication device 110 includes a camera (not shown) that can be activated to capture a video stream corresponding to a field-of-view of the camera for the purpose of streaming live video during a PTV communication session with other video communication devices. In accordance with some embodiments, each video communication device 110 is configured to continuously capture and store pre-buffered video in a memory. In some embodiments, the video communication device 110 stores the captured pre-buffered video in a circular buffer of a device memory such that a more recent video overwrites a less recent video when the circular buffer is full. The size of the memory and therefore the size of the circular buffer may be limited in some situations. For example, the circular buffer may only be capable of storing a limited amount of video (e.g., 5 seconds of video at any given point in time). As used herein, the term "pre-buffered video" corresponds to a portion of video that was recorded and stored in a circular buffer by the video camera even when the video communication device 110 is not actively participating in a PTV communication session to share a live video stream with other video communication devices 110. The "pre-buffered video" is also interchangeably referred to herein as a pre-PTV stream.

Each video communication device 110 includes or is in communication with a video analytics engine that is configured to analyze the pre-buffered video and detect objects of interest from the pre-buffered video. In one embodiment, the video analytics engine is programmed with a detection classifier that evaluates the pre-buffered video to determine if an instance of a person, object, or event of interest (collectively referred to as objects of interest) as defined in the detection classifier is detected or not from the video stream. When an object of interest is detected in the pre-buffered video, the video analytics engine provides to the video communication device 110 information related to the detected object of the interest as well as an identification of one or more video segments (e.g., frame numbers, time etc.) in the pre-buffered video where the object of interest is included. In one embodiment, the video analytic engine continuously analyzes the pre-buffered video in the memory and provides information related to the detected objects of interest as well as the segments in which they are identified to the video communication device 110. In other embodiments, the video analytics engine initiates the analysis of the pre-buffered video to detect objects of interest in the pre-buffered video only when the video communication device 110 detects a PTV activation command for establishing a PTV communication session for the purpose of sharing a video stream captured at the video communication device 110 with other video communication devices included in a predetermined video group.

The communication system 100 includes an incident database 130 that stores information associated with one or more incidents assigned to public safety officers operating the video communication devices 110. The incident database 130 may be stored at a memory device (e.g., local memory or a cloud memory) that is accessible by the video communication device 110. The information includes, for each incident, an incident identifier (e.g., a computer aided dispatch identifier (CAD ID)), type or severity of incident, incident location, public safety officers assigned to the incident, metadata related to persons (e.g., facial characteristics), objects (e.g., bags etc.), or areas of interest (e.g., particular seats or areas in a stadium) (collectively referred to as objects of interest) for a particular type of incident, and user or device profiles (e.g., talk group/video group identifier), corresponding to public safety officers assigned to the incident. In accordance with some embodiments, a video communication device 110 uses the CAD ID of an incident assigned to a transmitting video communication device (i.e., a video communication device 110 at which the PTV activation command is detected) to form a video communication group with other video communication devices to which the same CAD ID is assigned. In one embodiment, a video communication device 110 prioritizes the type of objects of interest to be detected within the pre-buffered video based on the CAD ID of an incident assigned to the video communication device 110. For example, when the incident corresponds to a hit-and-run case, an object of interest that indicates a car or an injured person is of higher priority than bicycles, trees, or animals. In this example, the video communication device 110 prioritizes the detection and sharing of objects of interest that are representative of a car or an injured person during a PTV communication session.

In accordance with some embodiments, each video communication device 110 may be affiliated to one or more video communication groups to enable the video communication devices 110 to instantly establish a PTV communication session with other video communication devices included in the same video communication group. In accordance with embodiments, the video communication device 110 establishes a PTV communication session when a PTV activation command is detected at the video communication device 110. The PTV activation command may be automatically generated when an object of interest is detected based on an analysis of the pre-buffered video and/or alternatively generated based on a user input detected at a PTV activation command interface (e.g., a hardware or a software button that can be pressed by the user to input a PTV activation command) implemented at the video communication device 110. When the PTV activation command is detected, the video communication device 110, for example, a video communication device 110-1, automatically establishes a PTV communication session with other video communication devices 110, for example, video communication devices 110-2, 110-3, included in a predetermined video communication group to which the video communication device 110-1 is affiliated. For example, the predetermined video communication group may include video communication devices 110-2, 110-3 of public safety officers that are assigned to the same incident as the video communication device 110-1 at which the PTV activation command was detected. In one embodiment, when the video communication device 110-1 detects a PTV activation command to initiate a PTV communication session, the video communication device 110-1 dynamically forms a video communication group with other video communication devices 110-2, 110-3 based on the type of objects detected in the pre-buffered video. For example, if the objects detected within the pre-buffered video include an injured person and a speeding vehicle, a first video communication device (e.g., video communication device 110-1 at which the PTV activation command is detected) capturing the pre-buffered video may automatically select a second video communication device (e.g., video communication device 110-2) associated with an police officer based on the detection of the speeding vehicle and a third video communication device (e.g., video communication device 110-3) associated with an emergency medical officer based on the detection of the injured person in the pre-buffered video. In this case, a video communication group is dynamically formed including the first video communication device 110-1, second video communication device 110-2, and third video communication device 110-3. The first video communication device 110-1 may be referred to as a transmitting video communication device, a sender device, or a sender. The second and third video communication devices 110-2, 110-3 may be referred to as recipient video communication devices, recipient devices, or recipients.

In accordance with embodiments, when a video communication device 110-1 detects a PTV activation command, the video communication device 110-1 establishes a PTV communication session with other video communication devices 110-2, 110-3 included in an identified video communication group. The video communication device 110-1, via the video analytics engine, analyzes the pre-buffered video (i.e., video stored in the circular buffer of the memory at the time of detection of the PTV activation command) to detect one or more objects of interest. This analysis may be performed by the video analytics engine either continuously as the pre-buffered video is recorded and stored at the circular buffer or alternatively in response to the detection of the PTV activation command. The video communication device 110 then selects a first set of video segments including a video segment in which the objects of interest appeared, for example, for a first time, within the pre-buffered video. In other words, the video communication device 110 identifies and marks particular segments that are of high priority for sharing with recipients when compared to other segments in the pre-buffered video. The video communication device 110-1 then time-compresses the pre-buffered video to generate a time-compressed preview of the pre-buffered video. The time-compressed preview includes the first set of video segments (i.e., particular segments marked as high priority for sharing to recipient devices) that are configured to be played at the recipient devices at a first playback speed rate and a second set of video segments that are configured to be played at a second playback speed rate that is greater than a first playback speed rate. For example, the first playback speed rate may correspond to '1×' speed (i.e., playback of one frame per second) and the second playback speed rate may correspond to '4×' speed (i.e., playback of four frames per second). The second set of video segments includes video segments from the pre-buffered video other than the first set of video segments. In other words, the second set of video segments includes unmarked video segments that do not include any detected objects of interest, or otherwise if an object of interest is included in one or more of the second set of video segments, the segment is not substantially different (in terms of visual appearance) from the segments already included in the first set of video segments. Accordingly, the time-compressed preview is generated to ensure that the entire length of the pre-buffered video can be played at a shorter time period at a recipient device while ensuring that the set of segments (i.e. first set of segments that are marked as high priority based on the objects of interest appearing in the segments) can be played at a normal playback speed rate (i.e., first playback speed rate) to enable the recipients to obtain the context of the incident even before the live video (i.e., video captured at the transmitting video communication device 110-1 in response to the detection of the PTV activation command) is streamed to the receiving video communication devices for synchronous playback.

The video communication device 110-1 then transmits the generated time-compressed preview of the pre-buffered video to recipient video communication devices during the PTV communication session while also simultaneously buffering PTV stream (also referred to as buffered PTV stream) captured at the video communication device 110. The buffered PTV stream refers to a video portion that is captured between a time at which the PTV activation command was detected and a time at which transmission of a live PTV stream for synchronous playback at the receiving video communication devices is to be commenced. In other words, the buffered PTV stream corresponds to a video stream that is being captured in response to the detection of the PTV activation command. In accordance with embodiments, in response to the PTV activation command, the buffered PTV stream is not immediately streamed as soon as it is captured at the transmitting video communication device 110-1 because time-compressed PTV stream is transmitted to the recipient video communication devices 110-2, 110-3 prior to the transmission of the buffered PTV stream. When the transmitting video communication device 110-1 detects that it has transmitted the time-compressed preview of the pre-buffered video to the recipient video communication devices, the transmitting video communication device 110-1 then transmits a time-compressed version of the buffered PTV stream in order to catch up with a live video stream that is being captured at the video communication device 110-1. For example, the time-compressed preview of the buffered PTV stream is generated based on configuring the buffered PTV stream to play at a particular playback speed rate that is determined based on a catchup time configured at the video communication device 110-1. The catchup time is the time allowed or required to commence transmission of live PTV stream for synchronous playback at the receiving devices. After transmitting the time-compressed buffered PTV stream, the video communication device 110-1 starts transmitting the live PTV stream to the recipient video communication devices 110-2, 110-3 for synchronous playback at the receiving video communication devices 110-2, 110-3. As used herein, the term "synchronous playback" refers to playback of video stream at the recipient video communication devices 110-2, 110-3 substantially (e.g., with a maximum delay of a few microseconds to account for the transmission time) at the same time the video stream was captured at the video communication device 110-1.

Figure 2:
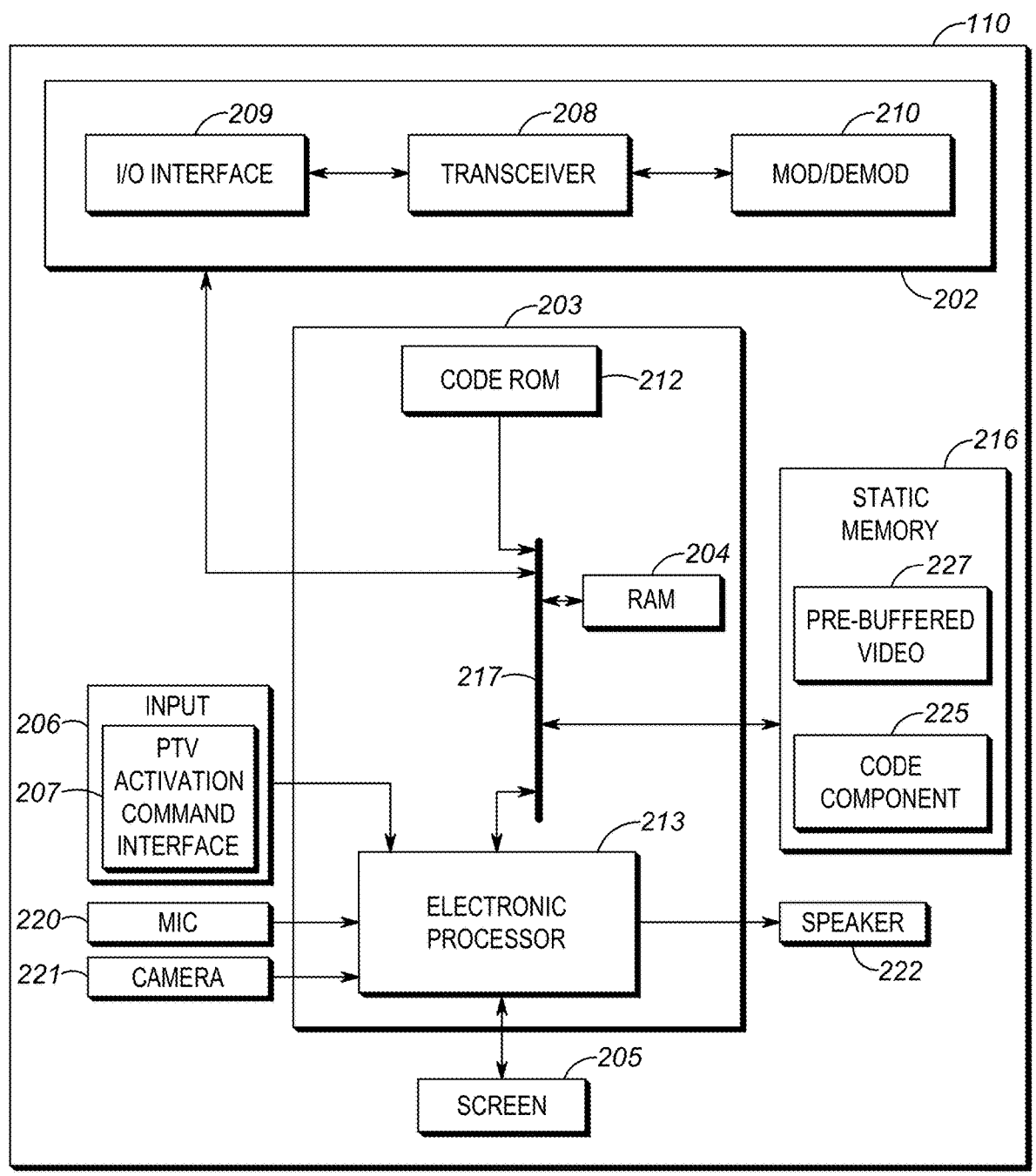
FIG. 2 is a block diagram of a video communication device shown in FIG. 1 in accordance with some embodiments.

The communication network 120 is an electronic communications network including wired and wireless connections. The communication network 120 may be implemented using a combination of one or more networks including, but not limited to, a wide area network, for example, the internet; a local area network, for example, a Wi-Fi network, or a near-field network, for example, a Bluetooth™ network. Other types of networks, for example, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof may also be used FIG. 2 is an example functional block diagram of a video communication device operating within the communication system 100 in accordance with some embodiments. The video communication device performs the functions of the video communication devices 110 shown in FIG. 1, and may be embodied in one or more communication devices or computing devices not illustrated in FIG. 1, and/or may be a distributed computing device across two or more of the foregoing (or multiple of a same type of one of the foregoing) and linked via a wired and/or wireless communication link(s). While FIG. 2 represents a video communication device 110 described above with respect to FIG. 1, depending on the type of video communication device 110, the video communication device 110 may include fewer or additional components in configurations different from that illustrated in FIG. 2.

As shown in FIG. 2, the video communication device 110 includes a communications unit 202 coupled to a common data and address bus 217 of a processing unit 203. The communications unit 202 includes one or more wired and/or wireless input/output (I/O) interfaces 209 that are configurable to communicate, for example, with other video communication devices 110 in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The video communication device 110 may also include one or more input devices 206, for example, keypad, pointing device, touch-sensitive surface, button, and the like. In one embodiment, the input device 206 includes a PTV activation command interface 207, for example, a hard or soft PTV button or key which when pressed by the user generates a PTV activation command to establish a PTV communication session with other video communication devices included in a video communication group. The video communication device 110 also includes a microphone 220, a camera 221, and an electronic display screen 205 (which, in some embodiments, may be a touch screen and thus also acts as an input 206), each coupled to be in communication with the processing unit 203.

The camera 221 captures video corresponding to its field-of-view for further processing by the processing unit 203, for example, for storing the captured video as a pre-buffered video 227 at a memory 216 and/or for further transmission as a video stream by the communications unit 202 to other video communication devices 110 when a PTV communication session is established. A speaker 222 may be present for reproducing audio that is decoded from voice or audio streams of calls received via the communications unit 202 from other devices, from digital audio stored at the video communication device 110, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 further includes an electronic processor 213 (for example, a microprocessor or another electronic device) coupled, by the common data and address bus 217, to a Random Access Memory (RAM) 204 and a static memory 216.

The one or more electronic processors 213 has ports for coupling to the display screen 205, the microphone 220, the camera 221, the user input interface device 206, and/or the speaker 222. Static memory 216 may store operating code 225 for the electronic processor 213 that, when executed, performs one or more of the blocks set forth in FIGS. 3 and 6, and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. In accordance with some embodiments, the static memory 216 may have access to or otherwise temporarily or permanently store information included in the incident database 130. For example, the video communication device 110 may be configured to store incident context information associated with a particular CAD identifier assigned to the video communication device 110 at the static memory 216.

In accordance with embodiments, the static memory 216 includes a circular buffer that stores pre-buffered video 227 including the most recent video (e.g., last 5 seconds of video) captured by the camera 221 of the video communication device 110. In accordance with embodiments, when the electronic processor 213 detects a PTV activation command at the PTV activation command interface 207, the electronic processor 213 performs the functions described in FIG. 3 and in particular transmits a time-compressed preview of the pre-buffered video 227. The time-compressed preview includes particular segments (e.g., segments containing objects of interest) that are configured to be played at a normal playback speed rate while the other segments are configured to be played at a higher playback speed rate to ensure that the users of the video communication devices 110 receiving the video stream are able to preview the pre-buffered video prior to receiving the PTV stream.

In accordance with some embodiments, the display screen 205 implemented at the video communication device 110 is configured to display video stream. When the display screen 205 is associated with a video communication device 110 operating in PTV transmission mode, the display screen 205 may display information related to the objects of interest that are detected within the pre-buffered video. Additionally, the display screen 205 may also provide an indication of a particular object of interest that will be highlighted at a recipient device. For example, the display screen 205 may indicate that an object of interest corresponding to an injured person will be highlighted during playback of a time-compressed preview of the pre-buffered video 227 at a video communication device 110 associated with an emergency medical personnel. Similarly, the display screen 205 may indicate that an object of interest corresponding to a speeding vehicle will be highlighted during playback of a time-compressed preview of the pre-buffered video 227 at a video communication device 110 associated with a police officer. When the display screen 205 is associated with a video communication device 110 operating in a PTV receiving mode (i.e., as a recipient of a PTV stream), the display screen 205 plays the video stream (i.e., time-compressed preview of the pre-buffered video 227 followed by the PTV stream) received during the PTV communication session. In this case, the display screen 205 may also highlight a particular object of interest (e.g., an injured person or speeding vehicle) that is relevant to the video communication device 110 during playback of the video stream received during the PTV communication session.

Figure 3:
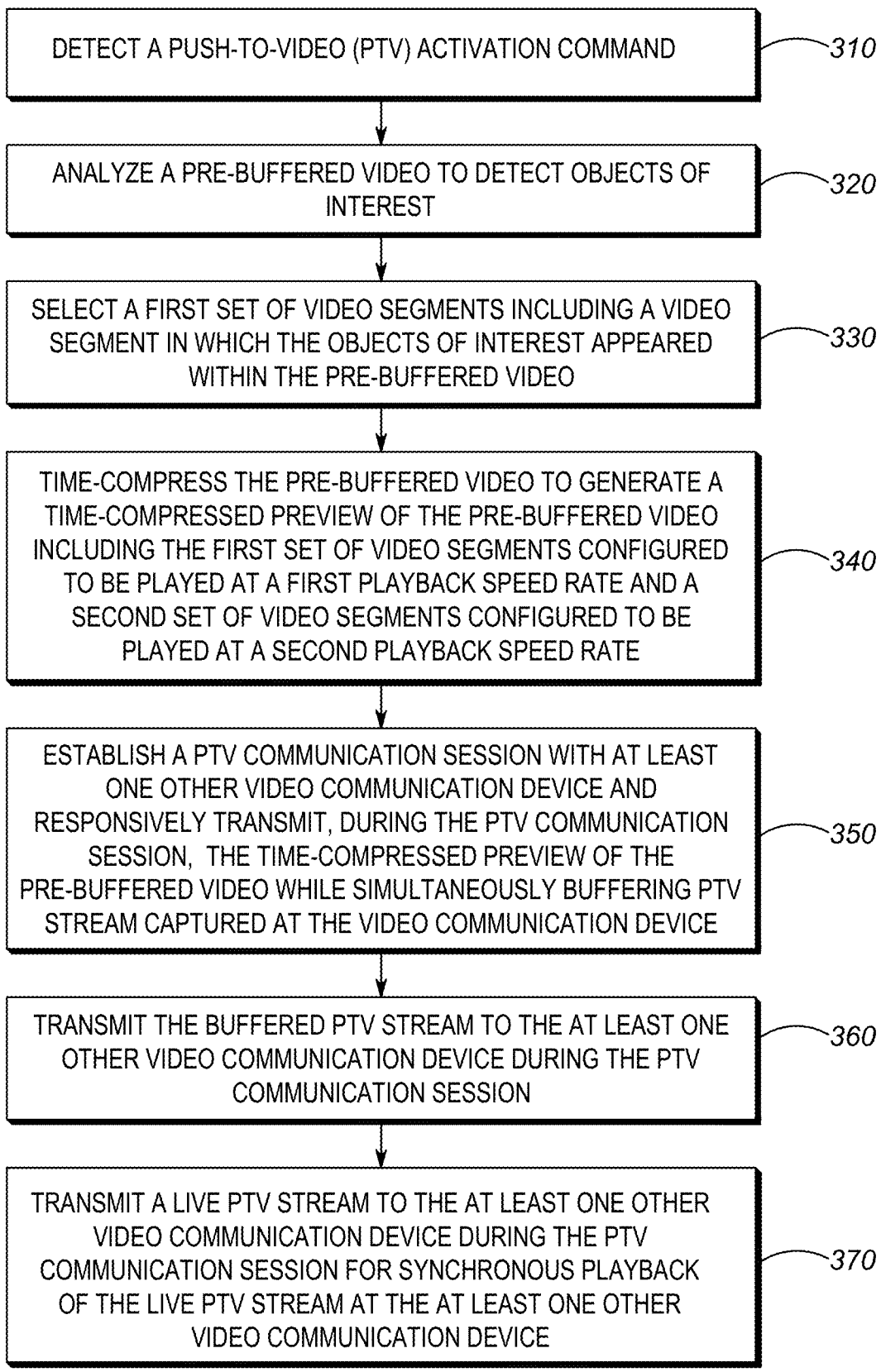
FIG. 3 illustrates a flowchart of a method for providing a time-compressed preview of a pre-buffered video during a push-to-video communication session in accordance with some embodiments.

Turning now to FIG. 3, a flowchart diagram illustrates a process 300 for providing a time-compressed preview of a pre-buffered video during a push-to-video (PTV) communication session in accordance with some embodiments. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. A video communication device 110 (e.g., a first video communication device 110-1, also referred to as a transmitting video communication device 110-1) shown in FIG. 1 or FIG. 2, and embodied as a singular computing device or distributed computing device may execute process 300 via an electronic processor 213 implemented at the video communication device 110. The first video communication device 110-1 may execute the process 300 at power-on, at some predetermined periodic time period thereafter, in response to a trigger raised locally at the device via an internal process or via an input interface (e.g., the user invoking the process 300 by pointing a camera at an incident region and/or by initiating a PTV communication session, for example, by selecting or depressing a PTV activation command interface 207 implemented at the first video communication device 110-1), or in response to a trigger from an accessory or an authorized external device (e.g., a portable radio or remote speaker microphone) to which the first video communication device 110-1 is communicably coupled, among other possibilities.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well.

Process begins at block 310 where the first video communication device 110-1 detects a push-to-video (PTV) activation command. In one embodiment, the PTV activation command is generated internally by a PTV activation command interface 207 implemented at the first video communication device 110-1 based on a user input received at the PTV activation command interface 207. The PTV activation command generated by the PTV activation command interface 207 is then detected by the electronic processor 213 of the first video communication device 110-1. In other embodiments, the PTV activation command may also be automatically generated based on user and/or device context, for example, based on input obtained from sensors. For example, when the sensor input (e.g., biometric sensor input indicating heart rate or accelerometer input indicating device/user movement) indicates that the user is engaged in pursuing a suspect or another incident, the PTV activation command interface may automatically generate a PTV activation command in order to establish a PTV communication session for sharing a video stream captured by a camera associated with the first video communication device 110-1. In accordance with embodiments, when the first video communication device 110-1 detects the PTV activation command, the first video communication device 110-1 switches the operation of the camera from a pre-buffered video mode to a PTV transmission mode. In the pre-buffered mode, the camera included in the first video communication device 110-1 continuously captures video of its field-of-view and stores the most recent video (referred to as pre-buffered video) in a circular buffer. In the PTV transmission mode, the camera captures the video (referred to as PTV stream) of its field-of-view but instead stores the video in a separate streaming buffer implemented at the memory for the purpose of sharing PTV stream with other video communication devices included in a video group during the PTV communication session.

At block 320, the first video communication device 110-1, via a video analytics engine, analyzes the pre-buffered video (e.g., pre-buffered video 227) to detect one or more objects of interest in the pre-buffered video. As described previously, the pre-buffered video corresponds to the most recent video that is recorded and stored in a circular buffer of the memory 216. Also, the pre-buffered video represents video that was recorded by the camera of the first video communication device 110 for a predetermined time duration (e.g., a maximum duration of video that can be stored in the circular buffer) immediately preceding the detection of the PTV activation command. In one embodiment, the video analytics engine continuously analyzes the most recent video as it overwrites the less recent video stored in the circular buffer of the memory. In this embodiment, the video analytics engine continuously analyzes the pre-buffered video and outputs information related to objects of interest as well as information identifying particular segments in which the objects of interest appeared within the pre-buffered video. Further, the video analytics engine continues to update information related to the objects of interest and segments in which the objects of interest appeared within the pre-buffered video to account for the changes (i.e., as less recent video is replaced with most recent video) in the pre-buffered video. In case a PTV activation command is detected, the first video communication device 110-1 uses the updated information related to the objects of interest as well as the segments in which the objects of interest were identified for further processing i.e., for the purpose of providing a time-compressed preview of the pre-buffered video. In other embodiments, the video analytics engine initiates its analysis of the pre-buffered video only when the first video communication device 110-1 detects the PTV activation command at block 310. In these embodiments, the video analytics engine analyzes the most recent video i.e., pre-buffered video as stored in the circular buffer at the point of detection of the PTV activation command for the purpose of detecting objects of interest. The video analytics engine then provides information related to the objects of interest and also information identifying particular segments in which the detected objects of interest appeared within the pre-buffered video.

In some embodiments, the first video communication device 110-1, prior to analyzing the pre-buffered video to detect one or more objects of interest, determines whether a video quality of the pre-buffered video 227 is greater than a predetermined video quality threshold. In these embodiments, the first video communication device 110-1 measures a video quality of the pre-buffered video based on one or more video features (e.g., camera motion/shaking/rotation, bad exposure, frame sharpness, out-of-focus detection, blur, etc.) that are extracted from the pre-buffered video captured by the first video communication device 110-1. For example, the first video communication device 110 may use measurements from sensors (e.g., accelerometer) to determine whether the camera was in a stable position while the pre-buffered video was recorded. If the camera was stable, the pre-buffered video may have a video quality that meets the predetermined video quality threshold. As another example, the pre-buffered video recorded by the first video communication device 110-1 may represent a video portion that was captured while the first video communication device 110-1 was inside the user's pocket. In this case, the pre-buffered video may not contain useful content for object of interest detection and/or for providing a preview of the pre-buffered video prior to transmitting live PTV stream during PTV communication session. In any case, in these embodiments, when the video quality of the pre-buffered video is not greater than the predetermined video quality threshold, the first video communication device 110-1 refrains from further processing the pre-buffered video. In these embodiments, the first video communication device 110-1 may not generate and/or include a time-compressed preview of the pre-buffered video in response to the PTV activation command, and instead directly commences the transmission of PTV stream (i.e., live PTV stream) to other video communication devices when a PTV activation command is detected. In other words, in these embodiments, the first video communication device 110-1 analyzes the pre-buffered video to detect objects of interest only when the video quality of the pre-buffered video is greater than a predetermined video quality threshold.

Next, at block 330, the first video communication device 110-1 selects, from the pre-buffered video, a first set of video segments including a video segment in which the one or more objects of interest detected at block 320 appeared, for example, for the first time, within the pre-buffered video. In accordance with embodiments, the first video communication device 110-1 selects the first set of video segments (i.e., particular segments marked as high priority for sharing to recipient devices) from the pre-buffered video 227 based on information obtained from the video analytics engine. For example, the information obtained from a video analytics engine may indicate that there are three objects of interest including a first object of interest representing an injured person, a second object of interest representing a speeding vehicle, and a third object of interest representing an animal. The information obtained from the video analytics engine may also indicate particular segments in which the three objects of interest appeared within the video. For example, assume that a pre-buffered video contains frames 1 through 10. The information obtained from the video analytics engine may indicate that the first object of interest representing an injured person appears in frames 3 through 10 of the pre-buffered video, the second object of interest representing the speeding vehicle appears in frames 3 through 7 of the pre-buffered video, and the third object of interest representing the animal appears in frames 1 to 10 of the pre-buffered video. In this case, the first video communication device 110-1 may select segments 3 through 7 as the first set of video segments because the objects representing the injured person and speeding vehicle are determined to be more important to highlight to the recipient devices than the object representing an animal. In accordance with embodiments, the first video communication device 110-1 ensures that a video segment, in which the one or more objects of interest appeared for a first time within the pre-buffered video, is also included in the first set of video segments. In the above example, frame 3 represents a segment in which the injured person as well as the speeding vehicle appeared for the first time within the pre-buffered video. Accordingly, in this example, the first video communication device 110-1 selects a first set of segments including a segment containing frame 3 in which the objects of interest representing the injured person or speeding vehicle appeared for the first time within the pre-buffered video. In accordance with some embodiments, the first set of segments may include frames that are not contiguous. For example, the first video communication device 110-1 may select frames 3-5 and frames 8-10 to be included in the first set of video segments when frames 3-5 or frames 8-10 include objects of interest that provide better incident context to a user. Further, the segments may be expressed in a form other than frame numbers. For example, if the length of pre-buffered video 227 is expressed in terms of playback time, then the video segments included in the first set of video segments may be expressed in terms of a time period. As an example, the first set of video segments may include a segment corresponding to the '3rd' second of video within the pre-buffered video. In this example, the '3rd' second of video may be the first time within the pre-buffered video when the detected objects of interest first appeared within the pre-buffered video.

In one embodiment, prior to selecting the first set of video segments, the first video communication device 110-1 truncates the pre-buffered video by discarding one or more video segments (e.g., frames) of the pre-buffered video that do not contain any useful content. The first video communication device 110-1 may discard a video frame that precedes the video frame in which the object of interest appeared for the first time within the pre-buffered video. For example, the first video communication device 110-1 may discard frames 1 and 2, but not frame 3 in which the objects of interest first appeared in the pre-buffered video. As another example, the first video communication device 110-1 may discard frame 1, but not frame 2 that immediately precedes the frame 3 in which the objects of interest first appeared in the pre-buffered video. In these embodiments, truncating the pre-buffered video to discard frames that do not include objects of interest or provide useful incident context ensures that the pre-buffered video can be shortened and further time-compressed to provide a quick preview of the pre-buffered video during a PTV communication session.

At block 340, the first video communication device 110-1 time-compresses the pre-buffered video to generate a time-compressed preview of the pre-buffered video including the first set of video segments selected at block 330 and further a second set of video segments that include video segments not included in the first set of video segments. As an example, assume that the first set of video segments selected at block 330 includes frames 3 through 7 in a pre-buffered video that includes frames 2 through 10, where frame 1 was discarded during truncation. In this example, the second set of video segments may include video segments representing frames 2, 8, 9, and 10, i.e., frames other than the frames 3 through 7 that are selected as the first set of video segments. In other words, frames 2, 8, 9, and 10 represent segments that were not marked as high priority for sharing with recipient devices. Further, at block 340, the first video communication device 110-1 configures the first set of video segments to be played at a first playback speed rate and the second set of video segments to be played at a second playback speed rate. In accordance with embodiments, the second playback speed rate is set at a higher playback speed rate than the first playback speed rate. The first playback speed rate may be set at a playback speed rate (e.g., at a normal playback speed rate of '1×') that will allow a user to extract incident context during playback of the first set of video segments included in the time-compressed preview of the pre-buffered video. The second playback speed rate may be set at a playback speed rate (e.g., at an accelerated playback speed rate of '4×') that will provide a time-compressed or accelerated preview of the second set of video segments included in the time-compressed preview of the pre-buffered video. As an example, the time-compressed preview of the pre-buffered video may include a first set of video segments representing frames 3 through 7 that will be played at a first playback speed rate and further a second set of video segments representing frames 2, 8, 9, and 10 that will be played at a second playback speed rate.

At block 350, the first video communication device 110-1 establishes, in response to detecting the PTV activation command and after time-compressing the pre-buffered video 227, a PTV communication session with at least one other video communication device (e.g., a second video communication device 110-2 and a third video communication device 110-3) and further transmits the time-compressed preview of the pre-buffered video 227 during the PTV communication session to the at least one other video communication device. The first video communication device 110-1 also simultaneously (i.e., during transmission of time-compressed preview) buffers PTV stream captured at the first video communication device 110-1 between a time at which the PTV activation command was detected and a time at which transmission of a live PTV stream for synchronous playback at the at least one other video communication device is to be commenced.

In accordance with some embodiments, the at least one other video communication device (i.e., recipient device) includes one or more video communication devices that are already affiliated to a video communication group to which the first video communication device 110-1 (i.e., transmitting video communication device) is also affiliated. In one embodiment, the at least one other video communication device includes one or more video communication devices that are dynamically selected to form a video communication group based on the type of objects of interest that are detected in the pre-buffered video 227. For example, if the objects detected within the pre-buffered video include an injured person and a speeding vehicle, the first video communication device 110-1 capturing the pre-buffered video may automatically select the at least one other video communication device including a second video communication device 110-2 associated with a police officer based on the detection of the speeding vehicle and a third video communication device 110-3 associated with an emergency medical officer based on the detection of the injured person.

During transmission of the time-compressed preview of the pre-buffered video 227, the first video communication device 110-1 also simultaneously buffers PTV stream (referred to as buffered PTV stream) captured at the first video communication device 110-1. The buffered PTV stream corresponds to a video stream that is being captured in response to the detection of the PTV activation command. In accordance with embodiments, in response to the PTV activation command, the buffered PTV stream is not streamed live as soon as it is captured at the transmitting video communication device because of the requirement to transmit time-compressed preview of the pre-buffered video as soon as the PTV communication session is established.

At block 360, when the first video communication device 110-1 determines that the transmission of the time-compressed preview of the buffered video is completed, the first video communication device 110-1 responsively transmits the buffered PTV stream to the at least one other video communication device during the PTV communication session. Since buffered PTV stream is being transmitted after the transmission of the time-compressed preview of the pre-buffered video, the recipient video communication device (i.e., the at least one other video communication device) will not be synchronously playing the buffered PTV stream. In other words, the recipient communication device will not be playing the buffered PTV stream substantially at the same time as the buffered PTV stream is being captured at the transmitting video communication device 110 because of the time delay caused by the playback of the time-compressed preview of the pre-buffered video at the recipient communication device. In accordance with some embodiments, the time delay caused by the playback of the time-compressed preview of the pre-buffered video may be shortened by transmitting a time-compressed version of the buffered PTV stream from the first video communication device 110-1 to the at least one other video communication device at block 360. Transmitting a time-compressed version of the buffered PTV stream also allows the recipient communication device to commence synchronous playback of the live stream after a catchup time. In other words, a compression factor (or playback speed rate) for the buffered PTV stream is calculated based on the maximum catchup time allowed ore required for the recipient communication device to commence the synchronous playback of the live PTV stream. As used herein, the term "synchronous playback" refers to playback of video stream substantially at the same time the video stream was captured at the video communication device 110.

In accordance with some embodiments, a compression factor (C) for generating a time-compressed version of the buffered PTV stream is calculated as a function of one or more of the following parameters: (a) synchronous playback commencement time ($T_{rt\theta}$) (i.e., time since playback of the time-compressed preview of the pre-buffered video commenced at the recipient device) indicating a future time at which synchronous playback of a live PTV stream should commence at the recipient video communication device; (b) pre-buffered video playback time ($T_p$), i.e., a time duration required for playback of the time-compressed preview of the pre-buffered video; and (c) catchup time ($T_c$), i.e., a time duration required to playback a time-compressed version of the buffered PTV stream after the playback of time-compressed preview of the pre-buffered video is completed (i.e., after a time duration equal to $T_p$) and to further commence synchronous playback of the live PTV stream. The pre-buffered video playback time ($T_p$) is calculated based on a mathematical formula: $T_p=(S1 \times P1)+(S2 \times P2)$, where S1 refers to the number of video segments included in the first set of video segments (i.e., video segments marked as high priority for sharing during PTV communication session) selected at block 320, S2 refers to the number of video segments included in the second set of video segments (i.e., segments other than the first set of video segments and discarded video segments), P1 refers to the first playback speed rate that is applied to the first set of video segments for playback, and P2 refers to the second playback speed rate that is applied to the second set of video segments.

In one embodiment, when the synchronous playback commencement time ($T_{rt\theta}$) is fixed (i.e., already configured at the device), then the compression factor (C) is calculated as a function of synchronous playback commencement time ($T_{rt\theta}$) and pre-buffered video playback time ($T_p$) based on the following mathematical formula:

$$C = \frac{T_{rt\theta}}{T_{rt\theta} - T_p}$$

For example, if synchronous playback commencement time ($T_{rt\theta}$) is set as '6' seconds (i.e., 6 seconds after playback of time-compressed preview of pre-buffered video begins at the recipient device) and pre-buffered video playback time ($T_p$) is '3' seconds, then the compression factor is calculated as '2' (i.e., expressed in terms of playback speed rate of 2×). In other words, the buffered PTV stream should be time-compressed at a rate of '2×' speed to ensure that the recipient communication device is able to synchronously playback the live PTV stream captured at the transmitting communication device in '6' seconds after the playback of the time-compressed preview of the pre-buffered video begins at the recipient device. In this example, the catchup time ($T_c$) is '3' seconds i.e., time required to commence synchronous playback of the live PTV stream after the playback of the time-compressed preview of the pre-buffered video. In other words, the entire '6' seconds of buffered PTV stream is played within the '3' seconds catchup time using a compression factor (C) of '2×' playback speed rate. The catchup time ($T_c$) is calculated as follows:

$$T_c = T_{rt\theta} - T_p$$

In another embodiment, when the catchup time ($T_c$) is fixed (i.e., already configured at the device), then the compression factor (C) is calculated as a function of catchup time ($T_c$) and pre-buffered video playback time ($T_p$) based on the following mathematical formula:

$$C = \frac{T_p + T_c}{T_c}$$

For example, if the catchup time ($T_c$) i.e., time required to commence synchronous playback of the live PTV stream, is set at '2' seconds and pre-buffered video playback time ($T_p$) is 3 seconds, then the compression factor is calculated as '2.5×' (i.e., expressed in terms of playback speed rate of 2.5×). In other words, the buffered PTV video should be time-compressed at a rate of '2.5×' speed to ensure that the recipient communication device is able to synchronously playback a live PTV stream captured at the transmitting communication device in '2' seconds (i.e., catchup time) after the playback of the time-compressed preview of the pre-buffered video is completed at the recipient device.

In any case, at block 360, the first video communication device 110-1 generates a time-compressed version of the buffered PTV stream by applying a compression factor (C) as calculated above. The video communication device 110-1 then transmits the buffered PTV stream to the at least one other communication device during the PTV communication session.

Next, at block 370, after the transmission of buffered PTV stream is completed, the first video communication device 110-1 transmits a live PTV stream to the at least one other video communication device during the PTV communication session for synchronous playback of the live PTV stream at the at least one other video communication device. As used herein, the term "live PTV stream" refers to a video portion that is played in a synchronous manner at the recipient communication device, i.e., substantially in real-time as the scene is being captured at the first video communication device 110-1. In accordance with embodiments, the first video communication device 110-1 applies normal playback speed rate (e.g., playback speed rate of '1×') to the live PTV stream for synchronous playback at the recipient communication device.

In accordance with embodiments, the first video communication device 110-1 embeds metadata in the time-compressed preview of the pre-buffered video that is transmitted to the at least one other video communication device at block 350. The metadata includes instructions for the at least one other video communication device (i.e., the recipient device) to highlight an identified one of the objects of interest during playback of the time-compressed preview of the pre-buffered video, the buffered PTV stream, and the live PTV stream at the at least one other video communication device. The metadata may further include instructions for the at least one other video communication device to pin a snapshot of the identified one of the objects of interest during playback of the live PTV stream at the at least one other video communication device to track and highlight any objects of interest appearing during the playback of the video stream. In these embodiments, different objects of interest may be highlighted at different recipient devices based on the role of respective users operating the recipient devices. For example, if the objects detected within the pre-buffered video include an injured person and a speeding vehicle, the first video communication device 110-1 may determine that the detected object corresponding to the injured person is relevant for sharing with a user assigned to an emergency medical officer role. The first video communication device 110-1 may further determine that the detected object corresponding to the speeding vehicle is relevant for sharing with a user assigned to a police officer role. Accordingly, the first video communication device 110-1 embeds two different types of metadata. For example, the first video communication device 110-1 embeds a first metadata including instructions for a first recipient device (e.g., second video communication device 110-2) associated with the user assigned to the police officer role to highlight the object corresponding to the speeding vehicle during playback of the time-compressed preview of the pre-buffered video, the buffered PTV stream, and the live PTV steam at the first recipient device. In this example, similarly the first video communication device 110-1 embeds a second metadata including instructions for a second recipient device (e.g., third video communication device 110-3) associated with the user assigned to the emergency medical officer role to highlight the object corresponding to the injured person during playback of the time-compressed preview of the pre-buffered video, the buffered PTV stream, and the live PTV stream at the second recipient device.

In some of these embodiments, the first video communication device 110-1 provides a graphical user interface to allow the user operating the first video communication device 110-1 to modify and/or update which objects of interest need to be highlighted in different recipient devices. For example, the graphical user interface at the first video communication device 110-1 may provide visual information indicating that the object corresponding to the speeding vehicle is relevant for sharing with a first user assigned to a first role, i.e., a police officer role. Similarly, the graphical user interface may provide visual information indicating that the object corresponding to the injured person is relevant for sharing with a second user assigned to a second role, i.e., an emergency medical officer role. In this example, the user of the transmitting video communication device may be able to provide input modifying or updating the objects that need to be highlighted when the video streams are played at the respective recipient video communication devices 110-2, 110-3. For example, during transmission of the live PTV stream during the PTV communication session, the user of the first video communication device 110-1 may provide input indicating that the object corresponding to the injured person is also relevant to the first user assigned to the police officer role. In response to detecting this input, the first video communication device 110-1 may modify the second metadata to include instructions for the recipient video communication device 110-2 associated with the user assigned to the police officer role to highlight the objects corresponding to the injured person and the speeding vehicle during playback of the live PTV stream at the recipient video communication device 110-2.

Figure 4:
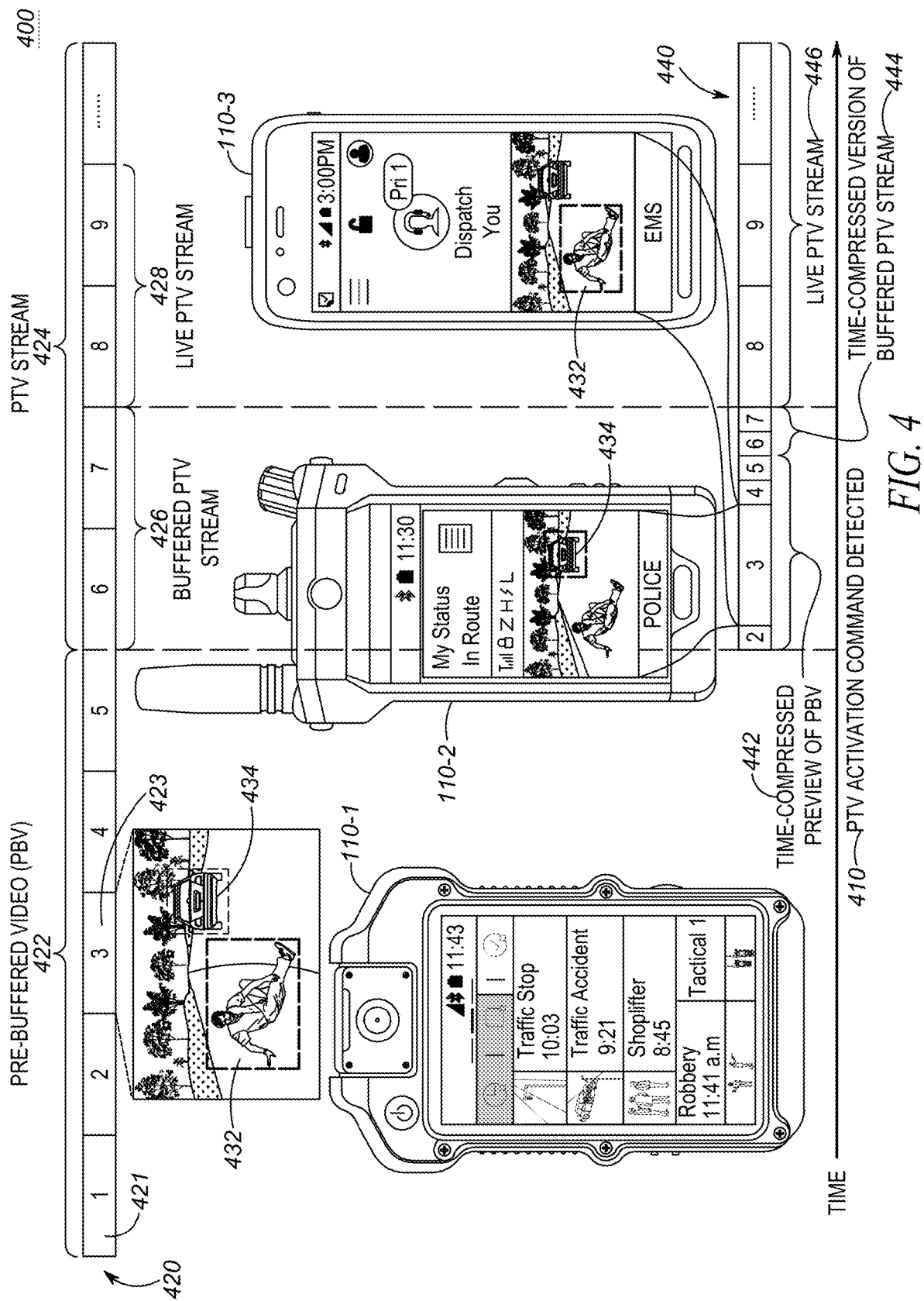
FIG. 4 illustrates an example use case in which the method of providing a time-compressed preview of a pre-buffered video during a push-to-video communication session can be advantageously implemented.

FIG. 4 illustrates an example use case 400 illustrating the process 300 for providing a time-compressed preview of a pre-buffered video during a push-to-video (PTV) communication session in accordance with some embodiments. In FIG. 4, a first video communication device 110-1 (also referred to as a transmitting video communication device 110-1) detects a PTV activation command 410 and establishes a PTV communication session with video communication devices 110-2, 110-3 (also referred to as recipient video communication devices 110-2, 110-3) to share video stream 420 captured at the transmitting video communication device 110. The video stream 420 captured at the transmitting video communication device includes a pre-buffered video (PBV) 422 including segments 1 through 5 that was captured prior to the detection of the PTV activation command and a PTV stream 424 including segments 6, 7, 8, 9 . . . etc., that are being captured in response to the detection of the PTV activation command. Each single video segment may correspond to one second length of video.

When the video communication device 110 detects the PTV activation command, the video communication device 110 analyzes the pre-buffered video 422 to identify objects of interest. In the example shown in FIG. 4, the video communication device 110-1 detects objects of interest including a first object representing an injured person 432 and a second object representing a speeding vehicle 434. Further, as described in block 330 of FIG. 3, the video communication device 110-1 identifies a first set of segments including a video segment in which the objects of interest appeared, for example, for the first time within the pre-buffered video 422. In this example, the video communication device 110-1 identifies 'segment 3' 423 in which the objects of interest including the injured person 432 and speeding vehicle 434 appeared for the first time within the pre-buffered video. Further, the video communication device 110-1 truncates pre-buffered video to one segment preceding the segment in which the detected objects of interest 432, 434 are included. In other words, the video communication device 110-1 discards 'segment 1' 421 from the pre-buffered video 432. In this example, the video communication device 110 generates a time-compressed preview of the pre-buffered video 422 by accelerating a playback speed rate of the segments other than 'segment 3' 423. In other words, the video communication device 110-1 generates a time-compressed preview such that 'segment 3' will be played at a normal playback speed rate (e.g., '1×' speed) and the remaining segments 2, 4, and 5 are played at an accelerated playback speed rate (e.g. '4×' speed).

In the example shown in FIG. 4, the video communication device 110-1 then (i.e., immediately in response to the detection of PTV activation command) establishes a PTV communication session to transmit a video stream 440 (corresponding to captured video stream 420) to recipient video communication devices 110-2, 110-3. The video stream 440 includes a time-compressed preview 442 of the pre-buffered video 422. The time-compressed preview 442 includes segment 3 that is played at a normal playback speed rate and segments 2, 4, and 5 that are played at an accelerated playback speed rate at the recipient video communication devices to enable the users of the recipient video communication devices to preview the objects of interest included in the pre-buffered video before watching the PTV stream 424 captured at the transmitting video communication device 110-1.

The segments 6 and 7 in the captured video stream 420 represent a portion of PTV stream that was simultaneously captured at the video communication device 110-1 during transmission of time-compressed preview 442 of the pre-buffered video 422. The PTV stream 424 portion representing segments 6 and 7 is also referred to as buffered PTV stream 426. After completing the transmission of the time-compressed preview 442 of the pre-buffered video 422. The video communication device 110 then generates and transmits a time-compressed version 444 of the buffered PTV stream 436. As previously described with reference to block 360 of FIG. 3, the time-compressed version 444 of the buffered PTV stream 426 is generated using a compression factor that is calculated as a function of one or more of synchronous playback commencement time ($T_{rt0}$), pre-buffered video playback time ($T_p$), and catchup time ($T_c$).

The segments 8, 9, . . . etc., in the video stream 420, represent a portion of the PTV stream 424 that is captured at the video communication device 110-1 for synchronous playback at the recipient video communication devices 110-2, 110-3. The portion of the PTV stream 424 (i.e., segments 8, 9, . . . etc.) that is captured for synchronous playback is referred to as a live PTV stream 428. The video data in the live PTV stream 446 (i.e., corresponding to live PTV stream 428 captured at the video communication device 110-1) are played at the recipient video communication devices 110-2, 110-3 substantially at the same time as they are captured at the transmitting video communication device 110-1. Accordingly, the video communication device 110-1 transmits the live PTV stream 446 (including segments 8, 9, . . . etc., of the captured live PTV stream 428) to the recipient video communication devices 110-2, 110-3 during the PTV communication session.

In one embodiment, the time-compressed preview 442 of the pre-buffered video 422 also embeds information identifying the object that needs to be tracked/highlighted during playback of the video stream 440 that includes the time-compressed preview 442 of the pre-buffered video 422, time-compressed version 444 of the buffered PTV stream 436, and live PTV stream 446. In the example shown in FIG. 4, the video communication device 110-1 determines that the object corresponding to the injured person 432 is relevant for sharing with a user assigned to a role of an emergency medical officer and further the object corresponding to the speeding vehicle 434 is relevant for sharing with a user assigned to a role of a police officer. Accordingly, the video communication device 110 embeds instructions in the time-compressed preview of the pre-buffered video to indicate that the speeding vehicle 434 should be highlighted during playback of the video stream 440 at the recipient video communication device 110-2 that is associated with the user assigned to the role of the police officer. In response, as shown in FIG. 4, the recipient video communication device 460 highlights the speeding vehicle 434 during playback of the video stream 440 at the recipient video communication device 110-2. Similarly, the video communication device 110-1 embeds instructions in the time-compressed preview 442 of the pre-buffered video 422 to indicate that the injured person 432 should be highlighted during playback of the video stream 440 at the recipient video communication device 110-3 that is associated with the user assigned to the role of the emergency medical officer. In response, as shown in FIG. 4, the recipient video communication device 450 highlights the injured person 432 during playback of the video stream 440 at the recipient video communication device 110-3.

Figure 5:
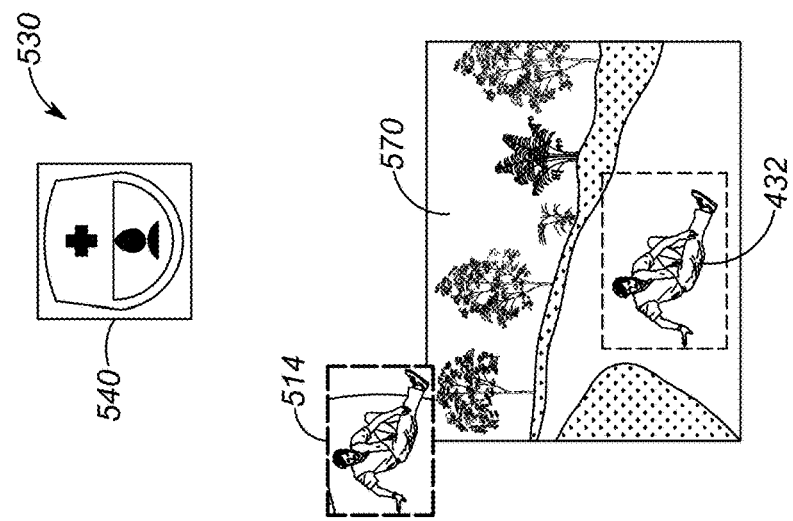
FIG. 5 illustrates an example of graphical user interfaces implemented at video communication devices in accordance with some embodiments.
Figure 5:
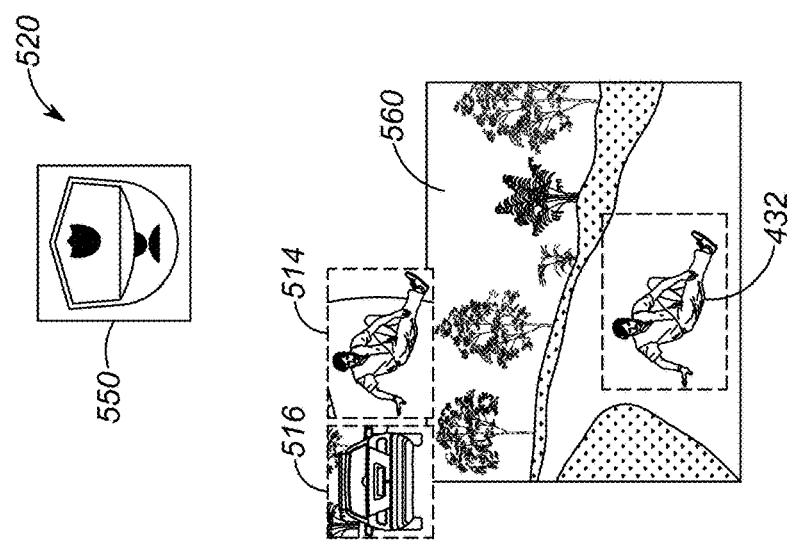
Figure 5:
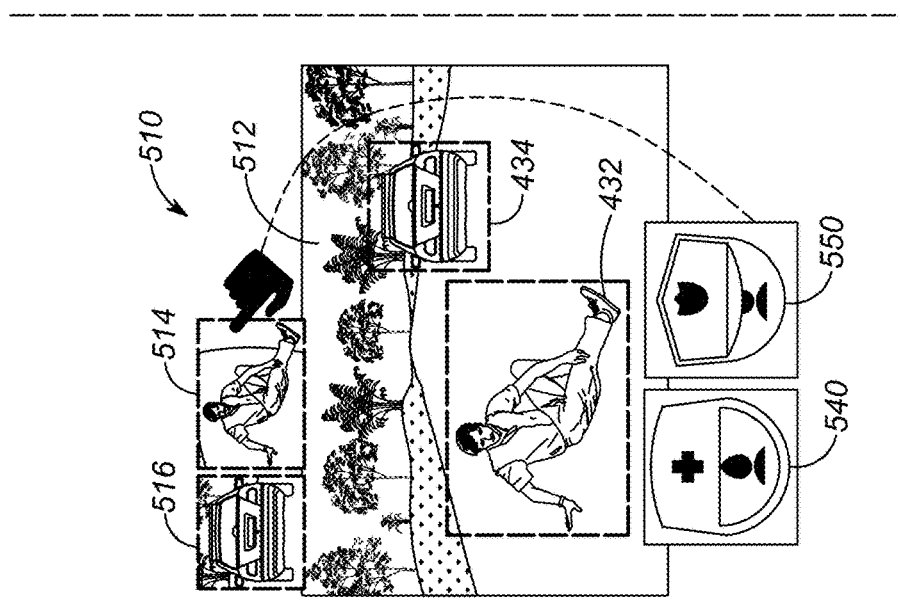

FIG. 5 shows an example of graphical user interfaces implemented at video communication devices 110 in accordance with some embodiments. The graphical user interface 510 implemented at a transmitting video communication device 110-1 displays a playback 512 of the video stream 440 that is transmitted for playback at recipient video communication devices 110-2, 110-3. For example, the playback 512 corresponds to a playback of a time-compressed preview of the pre-buffered video. In accordance with some embodiments, the objects of interest detected from the pre-buffered video are highlighted in the playback 512. As shown in FIG. 5, the objects representing the injured person 432 and speeding vehicle 434 are highlighted in the graphical user interface 510. Also, the graphical user interface 510 identifies recipients of the PTV stream. For example, an avatar 540 corresponding to a user assigned to an emergency medical officer role and an avatar 550 corresponding to a user assigned to a police officer role are added to the graphical user interface 510. In addition, snapshots 514, 516 of the objects of interest detected from the pre-buffered video are pinned or placed on a portion of the graphical user interface 510. In accordance with some embodiments, different objects may be assigned to different recipient video communication devices for watching or tracking. For example, the video communication device 110-1 may determine that the object representing the injured person is relevant for watching/tracking by a user assigned to the role of the emergency medical officer role and accordingly may automatically assign the object representing the injured person to the recipient video communication device 110-3 associated with the user assigned to the role of the emergency medical officer role. The video communication device 110-1 may embed this assignment as metadata along with the transmission of the time-compressed preview of the pre-buffered video during the PTV communication session. In response, as shown in FIG. 5, the recipient video communication device 110-3 pins or places a snapshot 514 of the object of interest i.e., the injured person on a portion of a graphical user interface 530 (implemented at the recipient video communication device 110-2) that also displays a playback 570 of the video stream received from the transmitting communication device 110-1. Similarly, the video communication device 110-1 may automatically determine that the object representing the speeding vehicle 434 is relevant for watching/tracking by a user assigned to the role of the police officer role and accordingly may automatically assign the object representing the speeding vehicle 434 to the recipient video communication device 110-2 associated with the user assigned to the role of the police officer role. The video communication device 110-1 may embed this assignment as metadata along with the transmission of the time-compressed preview of the pre-buffered video during the PTV communication session. In response, as shown in FIG. 5, the recipient communication device 110-2 pins or places a snapshot 516 of the object of interest i.e., the speeding vehicle 434 on a portion of a graphical user interface 520 (implemented at the recipient video communication device 110-3) that also displays a playback 560 of the video stream received from the transmitting communication device 110-1. Pinning or placing a snapshot 514 of the object representing the injured person will allow the user operating the recipient video communication device 110-2 to track the objects of interest even if that object is no longer appearing in the scene of the live PTV stream. For example, the speeding vehicle 434 is no longer appearing in the playback 560 displayed on the graphical user interface of the recipient video communication device 110-2. In this case, the pinned snapshot 516 allows the user operating the recipient video communication device 110-2 to track an object even if the object is not operating in the current video segment being played. In addition, the recipient communication device 110-2 also continuously tracks the video stream received during the PTV communication session and highlights the objects whenever they appear in any segment during playback 560 of the video stream.

Further, in the example shown in FIG. 5, the graphical user interface 510 allows the user of the transmitting video communication device 110-1 to add and/or remove the objects of interest that are pinned at a particular recipient communication device. For example, the user of the transmitting video communication device 110-1 can drag a snapshot 514 of the object representing the injured person 432 onto an avatar 540 that represents a recipient assigned to the police officer role. The video communication device 110-1, in response to this user input, provides an instruction to the recipient video communication device 110-2 associated with the user assigned to the police officer role to pin an additional snapshot 514 representing the injured person 432. When the recipient video communication device 110-2 receives this instruction from the video communication device 110-1, the recipient video communication device 110-2 places a second snapshot 514 representing the injured person 432 and further tracks for the appearance of the injured person 432 in the video stream received during the PTV communication session. When the injured person 432 appears in the video stream, the recipient video communication device 110-2 highlights the object representing the injured person 432 whenever the injured person 432 appears or reappears on any segment during playback 560 of the video stream.

Figure 6:
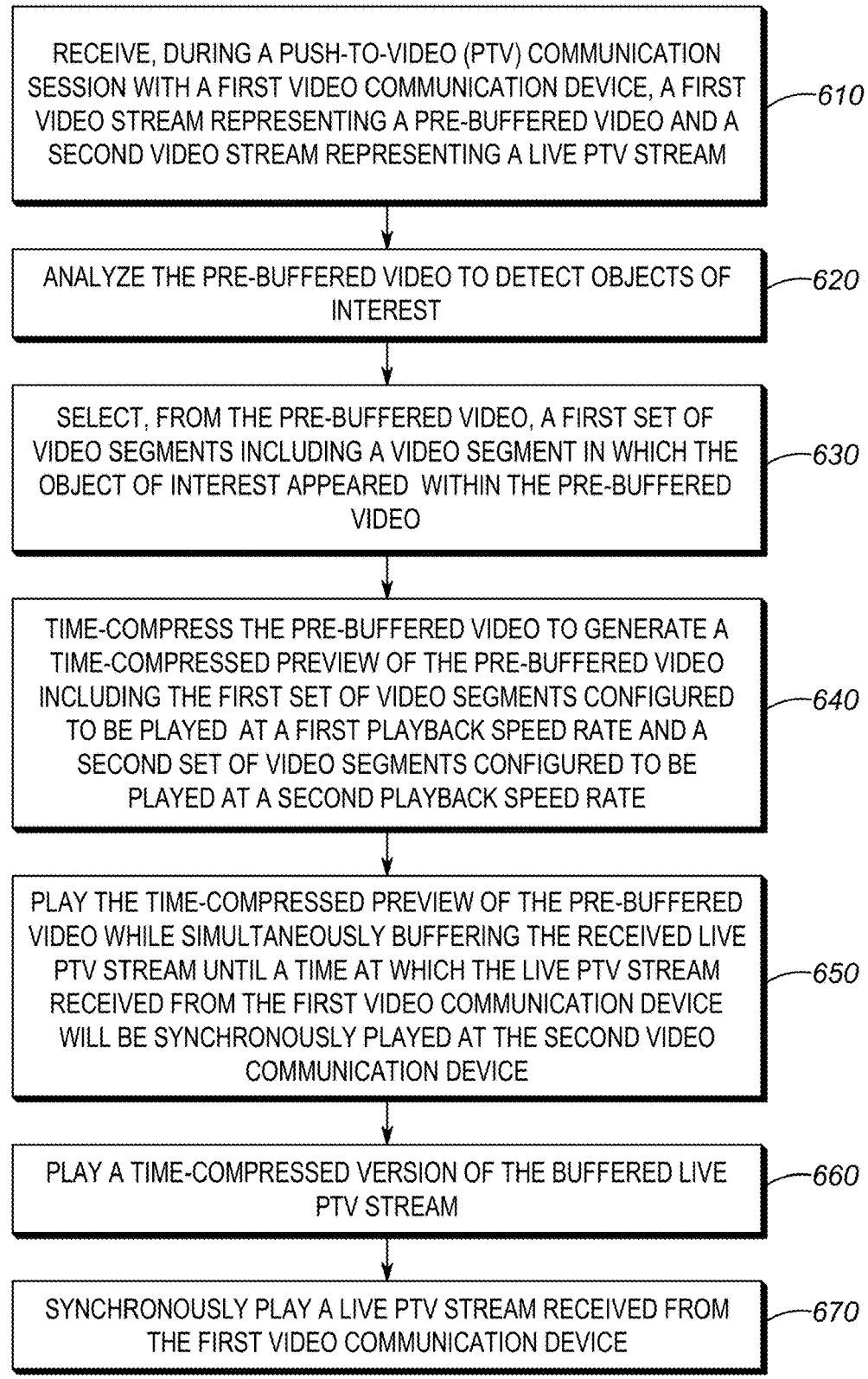
FIG. 6 illustrates a flowchart of another method for providing a time-compressed preview of a pre-buffered video during a push-to-video communication session in accordance with some embodiments.

FIG. 6 is a flowchart diagram illustrating a process 600 of providing a time-compressed preview of a pre-buffered video during a push-to-video (PTV) communication session in accordance with some embodiments. While a particular order of processing steps, message receptions, and/or message transmissions is indicated in FIG. 6 as an example, timing and ordering of such steps, receptions, and transmissions may vary where appropriate without negating the purpose and advantages of the examples set forth in detail throughout the remainder of this disclosure. A video communication device 110 (e.g., a second video communication device 110-2, also referred to as a recipient video communication device 110-2) shown in FIG. 1 or FIG. 2, and embodied as a singular computing device or distributed computing device may execute process 600 via an electronic processor 213 implemented at the video communication device 110. The second video communication device 110-2 may execute the process 600 during a PTV communication session with a transmitting video communication device such as a first video communication device 110-1.

The process 600 of FIG. 6 need not be performed in the exact sequence as shown and likewise various blocks may be performed in different order or alternatively in parallel rather than in sequence. The process 600 may be implemented on variations of the system 100 of FIG. 1 as well.

Process begins at block 610 when the second video communication device 110-2 receives, during a PTV communication session with a first video communication device 110-1, a first video stream representing a pre-buffered video and a second video stream representing a live PTV stream. In these embodiments, when the first video communication device 110-1 detects a PTV activation command, it immediately transmits both the pre-buffered video (i.e., the most recent video captured and stored at a circular buffer until the point of detection of the PTV activation command) and a live PTV stream that is being captured in response to the PTV activation command. In other words, in the embodiments that implement the process 600, unlike the embodiments described with respect to the process 300, the first video communication device 110-1 does not generate a time-compressed preview of the pre-buffered video and further does not delay the transmission of the live PTV stream. Instead, in the process 600, as will be further described below, the second video communication device 110-2 itself generates and provides a time-compressed preview of the pre-buffered video based on the video stream received from the first video communication device 110-1 during the PTV communication session.

In any case, when the second video communication device 110-2 receives a first video stream representing the pre-buffered video and a second video stream representing the live video stream during a PTV communication session with the first video communication device 110-1, the second video communication device 110-2, through a video analytics engine, analyzes the pre-buffered video received from the first video communication device 110-1 to detect one or more objects of interest in the pre-buffered video as shown in block 620. As described previously, the pre-buffered video corresponds to the most recent video that is recorded and stored in a circular buffer of a memory implemented at the first video communication device 110-1. Also, the pre-buffered video 227 represents video that was recorded by the camera of the first video communication device 110 for a predetermined time duration (e.g., a maximum length of the most recent video that can be stored in the circular buffer) immediately preceding the detection of the PTV activation command at the first video communication device 110-1. In some embodiments, the second video communication device 110-2, prior to analyzing the pre-buffered video to detect one or more objects of interest, determines whether a video quality of the pre-buffered video is greater than a predetermined video quality threshold. In these embodiments, the second video communication device 110-2 measures a video quality of the pre-buffered video based on one or more video features (e.g., camera motion/shaking/rotation, bad exposure, frame sharpness, out-of-focus detection, blur, etc.) that are extracted from the pre-buffered video captured by the first video communication device 110-1. For example, the second video communication device 110-2 may use metadata received along with the pre-buffered video from the first video communication device to determine whether the first video communication device's 110-1 camera was in a stable position while the pre-buffered video was recorded. If the camera was stable, the pre-buffered video may have a video quality that meets the predetermined video quality threshold. As another example, the pre-buffered video recorded by the first video communication device 110-1 may represent a video that was captured while the first video communication device 110-1 was inside the user's pocket. In this case, the pre-buffered video may not contain useful content for object of interest detection and/or for providing a time-compressed preview of the pre-buffered video during PTV communication session. In any case, in these embodiments, when the video quality of the pre-buffered video is not greater than the predetermined video quality threshold, the video communication device 110 refrains from further processing the pre-buffered video. In these embodiments, the second video communication device 110-2 may not generate and/or playback a time-compressed preview of the pre-buffered video, and instead directly commences the playback of the second video stream (i.e., live PTV stream) received from the first video communication device 110-1. In other words, in these embodiments, the second video communication device 110-2 analyzes the pre-buffered video to detect objects of interest only when the video quality of the pre-buffered video is greater than a predetermined video quality threshold.

Next, at block 630, the second video communication device 110-2 selects, from the pre-buffered video, a first set of video segments including a video segment in which the one or more objects of interest detected at block 320 appeared, for example, for the first time within the pre-buffered video. In accordance with embodiments, the second video communication device 110-2 selects the first set of video segments (i.e., particular segments marked as high priority for playing back at a normal playback speed rate) from the pre-buffered video based on information obtained from the video analytics engine. For example, the information obtained from a video analytics engine may indicate that there are three objects of interest including a first object of interest representing an injured person, a second object of interest representing a speeding vehicle, and a third object of interest representing an animal. The information obtained from the video analytics engine may also indicate particular segments in which the three objects of interest appeared within the video. For example, assume that a pre-buffered video contains frames 1 through 10. The information obtained from the video analytics engine may indicate that the first object of interest representing an injured person appears in frames 3 through 10 of the pre-buffered video, the second object of interest representing the speeding vehicle appears in frames 3 through 7 of the pre-buffered video, and the third object of interest representing the animal appears in frames 1 to 10 of the pre-buffered video. In this case, the second video communication device 110-2 may select segments 3 through 7 as the first set of video segments because the objects of interest representing the injured person and speeding vehicle are determined to be more important to highlight to a user operating the second video communication device 110-2 than the object of interest representing an animal. In accordance with some embodiments, the second video communication device 110-2 ensures that a video segment, in which the one or more objects of interest appeared for a first time within the pre-buffered video, is also included in the first set of video segments. In the above example, frame 3 represents a segment in which the injured person as well as the speeding vehicle appeared for the first time within the pre-buffered video. Accordingly, in this example, the second video communication device 110-2 selects a first set of segments including a segment representing frame 3 in which the objects of interest representing the injured person or speeding vehicle appeared for the first time within the pre-buffered video. In accordance with some embodiments, the first set of segments may include frames that are not contiguous. For example, the second video communication device 110-2 may select frames 3-5 and frames 8-10 to be included in the first set of video segments when frames 3-5 or frames 8-10 include objects of interest that provide better incident context. Further, the segments may be expressed in a form other than frame numbers. For example, if the length of pre-buffered video is expressed in terms of playback time, then the video segments included in the first set of video segments may be expressed in terms of a time period. As an example, the first set of video segments may include a segment corresponding to the '3rd' second of video within the pre-buffered video. In this example, the '3rd' second of video may be the first time within the pre-buffered video when the detected objects of interest first appeared within the pre-buffered video.

In one embodiment, prior to selecting the first set of video segments, the second video communication device 110-2 truncates the pre-buffered video by discarding one or more video segments (e.g., frames) of the pre-buffered video that precede the video segment in which the object of interest appeared for the first time within the pre-buffered video. For example, the second video communication device 110-2 may discard frames 1 and 2, but not frame 3 in which the objects of interest first appeared in the pre-buffered video. As another example, the second video communication device 110-2 may discard frame 1, but not frame 2 that immediately precedes the frame 3 in which the objects of interest first appeared in the pre-buffered video. In these embodiments, truncating the pre-buffered video to discard frames that do not include objects of interest or provide useful incident context ensures that the pre-buffered video can be shortened and further time-compressed to provide a quick preview of the pre-buffered video during the playback of the video at the second video communication device 110-2.

At block 640, the second video communication device 110-2 time-compresses the pre-buffered video to generate a time-compressed preview of the pre-buffered video including the first set of video segments (selected at block 630) and further a second set of video segments that include video segments not included in the first set of video segments. As an example, assume that the first set of video segments selected at block 630 includes frames 3 through 7 in a pre-buffered video that includes frames 2 through 10, where frame 1 was discarded during truncation. In this example, the second set of video segments may include video segments representing frames 2, 8, 9, and 10, i.e., frames other than the frames 3 through 7 that are selected as the first set of video segments. In other words, frames 2, 8, 9, and 10 represent segments that were not marked as high priority for playing back at a normal playback speed rate while providing a preview of the pre-buffered video. Further, at block 640, the second video communication device 110-2 configures the first set of video segments to be played at a first playback speed rate and the second set of video segments to be played at a second playback speed rate. In accordance with embodiments, the second playback speed rate is set at a higher playback speed rate than the first playback speed rate. The first playback speed rate may be set at a playback speed rate (e.g., at a normal playback speed rate of '1×') that will allow a user to extract incident context during playback of the first set of video segments included in the time-compressed preview of the pre-buffered video. The second playback speed rate may be set at a playback speed rate (e.g., at an accelerated playback speed rate of '4×') that will provide a time-compressed or accelerated preview of the second set of video segments included in the time-compressed preview of the pre-buffered video. As an example, the time-compressed preview of the pre-buffered video may include a first set of video segments representing frames 3 through 7 that will be played at a first playback speed rate and further a second set of video segments representing frames 2, 8, 9, and 10 that will be played at a second playback speed rate.

Next, at block 650, the second video communication device 110-2 plays the time-compressed preview of the pre-buffered video generated at block 640 while also simultaneously buffering the live PTV stream received from the first video communication device 110-1. The received live PTV stream is buffered until a time at which the live PTV stream received from the first video communication device 110-1 can be synchronously played at the second video communication device 110-2. In accordance with embodiments, the second video communication device 110-2 highlights the objects of interest while playing the time-compressed preview of the pre-buffered video. In one embodiment, the objects of interest to be highlighted during playback of the time-compressed preview of the pre-buffered video depends on the role of a user operating the second video communication device 110-2. For example, if the user is assigned to a police officer role, the second video communication device 110-2 may highlight only an object corresponding to a speeding vehicle that appears during the playback of the preview. If the user is assigned to an emergency medical officer role, the second video communication device 110-2 may highlight only an object corresponding to an injured person appearing during the playback of the preview.

At block 660, when the second video communication device 110-2 determines that the playback of the time-compressed preview of the pre-buffered video is completed, the second video communication device 110-2 generates and plays a time-compressed version of the buffered live PTV stream. As used herein, the term "buffered live PTV stream" refers to the live stream that was captured and transmitted by the first video communication device 110-1 immediately in response to the detection of the PTV activation command at the first video communication device 110-1 and further buffered by the second video communication device until a time at which the live stream can be synchronously played at the second video communication device 110-2. In one embodiment, the second video communication device 110-2 generates a time-compressed version of the buffered live PTV stream based on a compression factor that is determined as a function of a time duration taken to receive the entire portion of the pre-buffered video, a playback duration of the time-compressed preview of the pre-buffered video and a time at which the live PTV stream can be synchronously played at the second video communication device 110-2.

At block 670, when the second video communication device 110-2 determines that the playback of the time-compressed version of the buffered live PTV stream is completed, the second video communication device 110-2 synchronously plays a live PTV stream received from the first video communication device 110-1 during the PTV communication session.

In accordance with some embodiments, the second video communication device 110-2 pins or places a snapshot of one or more objects of interest that are relevant for watching/tracking by a user operating the second video communication device 110-2. For example, the second video communication device 110-2 may place a snapshot of the injured person and/or the speeding vehicle on a playback interface during playback of the time-compressed preview of the pre-buffered video, time-compressed version of the buffered live PTV stream, and live PTV stream. In accordance with some embodiments, the second video communication device 110-2 continues to track the objects of interest and highlights the objects whenever the objects appear during playback of the video stream received from the first video communication device 110-1 during the PTV communication session.

As should be apparent from this detailed description, the operations and functions of the computing devices described herein are sufficiently complex as to require their implementation on a computer system, and cannot be performed, as a practical matter, in the human mind. Video communication devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of providing a time-compressed preview of a pre-buffered video during a push-to-video (PTV) communication session, the method comprising:

detecting, at a video communication device, a PTV activation command;

analyzing, at the video communication device, a pre-buffered video to detect one or more objects of interest, the pre-buffered video representing a most recent video that was recorded at the video communication device for a predetermined time duration immediately preceding the detection of the PTV activation command;

selecting, at the video communication device, from the pre-buffered video, a first set of video segments including a video segment in which the objects of interest appear within the pre-buffered video;

time-compressing, at the video communication device, the pre-buffered video to generate a time-compressed preview of the pre-buffered video including the first set of video segments configured to be played at a first playback speed rate and a second set of video segments configured to be played at a second playback speed rate, the second set of video segments including video segments from the pre-buffered video other than the first set of video segments, wherein the second playback speed rate is greater than the first playback speed rate;

establishing, at the video communication device, in response to the PTV activation command, a PTV communication session with at least one other video communication device, and responsively transmitting, during the PTV communication session, the time-compressed preview of the pre-buffered video while simultaneously buffering PTV stream captured at the video communication device between a time at which the PTV activation command was detected and a time at which transmission of a live PTV stream for synchronous playback at the at least one other video communication device is to be commenced; and determining, at the video communication device, that the transmission of the time-compressed preview of the pre-buffered video is completed, and responsively transmitting the buffered PTV stream to the at least one other video communication device during the PTV communication session; and determining, at the video communication device, that the transmission of the buffered PTV stream is completed, and responsively transmitting a live PTV stream to the at least one other video communication device during the PTV communication session for synchronous playback of the live PTV stream at the at least one other video communication device.

2. The method of claim 1, further comprising:

determining, at the video communication device, whether a video quality of the pre-buffered video is greater than a predetermined video quality threshold; and analyzing the pre-buffered video to detect the objects of interest only when the video quality of the pre-buffered video is greater than the predetermined video quality threshold.

3. The method of claim 2, wherein when the video quality of the pre-buffered video is not greater than the predetermined video quality threshold, the method further comprising:

refraining from transmitting the time-compressed preview of the pre-buffered video and the buffered PTV stream, and instead directly transmitting a live PTV stream to the at least one other video communication device during the PTV communication session.

4. The method of claim 1, wherein transmitting the buffered PTV stream comprises:
   transmitting a time-compressed version of the buffered PTV stream, wherein the time-compressed version of the buffered PTV stream is generated by time-compressing the buffered PTV stream based on a compression factor that is determined as a function of a playback duration of the time-compressed preview of the pre-buffered video and a time at which synchronous playback of a live PTV stream should commence at the at least one other video communication device.

5. The method of claim 1, where prior to selecting, the method comprising:
   truncating the pre-buffered video by discarding one or more video segments of the pre-buffered video that precede the video segment in which the objects of interest appeared for the first time within the pre-buffered video.

6. The method of claim 1, further comprising:
   embedding metadata in the time-compressed preview of the pre-buffered video, the metadata including instructions for the at least one other video communication device to highlight an identified one of the objects of interest during playback of the time-compressed preview of the pre-buffered video, the buffered PTV stream, and the live PTV stream at the at least one other video communication device.

7. The method of claim 6, wherein the metadata further includes instructions for the at least one other video communication device to place a snapshot of the identified one of the objects of interest on a playback interface during playback of the live PTV stream at the at least one other video communication device.

8. The method of claim 1, wherein the at least one other video communication device includes a second video communication device associated with a first user role and a third video communication device associated with a second user role, the method further comprising:
   determining that a first object of the objects of interest is relevant to the first user role and a second object of the objects of interest is relevant to the second user role; and
   embedding a first metadata and a second metadata in the time-compressed preview of the pre-buffered video, the first metadata including instructions for the second video communication device to highlight the first object during playback of the time-compressed preview of the pre-buffered video, the buffered PTV stream, and the live PTV stream at the second video communication device, and the second metadata including instructions for the third video communication device to highlight the second object during playback of the time-compressed preview of the pre-buffered video, the buffered PTV stream, and the live PTV stream at the third video communication device.

9. The method of claim 8, further comprising:
   displaying, via an electronic display coupled to the video communication device, a graphical user interface indicating that the first object is relevant to the first user role and the second object is relevant to the second user role; and
   detecting, during transmission of the live PTV stream during the PTV communication session, a user input indicating that the first object is also relevant to the second user role, and responsively modifying the second metadata including instructions for the third video communication device to highlight both the first and second objects during playback of the live PTV stream at the third video communication device.

10. A video communication device, comprising
    a memory for storing a pre-buffered video;
    a transceiver; and
    an electronic processor communicatively coupled to the memory and the transceiver, wherein the electronic processor is configured to:
    detect a PTV activation command;
    analyze the pre-buffered video to detect one or more objects of interest, the pre-buffered video representing a most recent video that was recorded at the video communication device for a predetermined time duration immediately preceding the detection of the PTV activation command;
    select a first set of video segments including a video segment in which the objects of interest appear within the pre-buffered video;
    time-compress the pre-buffered video to generate a time-compressed preview of the pre-buffered video including the first set of video segments configured to be played at a first playback speed rate and a second set of video segments configured to be played at a second playback speed rate, the second set of video segments including video segments from the pre-buffered video other than the first set of video segments, wherein the second playback speed rate is greater than the first playback speed rate;
    establish, in response to the PTV activation command, a PTV communication session with at least one other video communication device, and responsively transmit, via the transceiver, during the PTV communication session, the time-compressed preview of the pre-buffered video while simultaneously buffering PTV stream captured at the video communication device between a time at which the PTV activation command was detected and a time at which transmission of a live PTV stream for synchronous playback at the at least one other video communication device is to be commenced; and
    determine that the transmission of the time-compressed preview of the pre-buffered video is completed, and responsively transmit, via the transceiver, the buffered PTV stream to the at least one other video communication device during the PTV communication session; and
    determine that the transmission of the buffered PTV stream is completed, and responsively transmit, via the transceiver, a live PTV stream to the at least one other video communication device during the PTV communication session for synchronous playback of the live PTV stream at the at least one other video communication device.

11. The video communication device of claim 10, wherein the electronic processor is configured to:
    determine whether a video quality of the pre-buffered video is greater than a predetermined video quality threshold; and
    analyze the pre-buffered video to detect the objects of interest only when the video quality of the pre-buffered video is greater than the predetermined video quality threshold.

12. The video communication device of claim 11, wherein the electronic processor is configured to:
    refrain from transmitting the time-compressed preview of the pre-buffered video and the buffered PTV stream when the video quality of the pre-buffered video is not greater than the predetermined video quality threshold, and instead directly transmit, via the transceiver, a live PTV stream to the at least one other video communication device during the PTV communication session.

13. The video communication device of claim 10, wherein the electronic processor is configured to:
transmit a time-compressed version of the buffered PTV stream, wherein the time-compressed version of the buffered PTV stream is generated by time-compressing the buffered PTV stream based on a compression factor that is determined as a function of a playback duration of the time-compressed preview of the pre-buffered video and a time at which synchronous playback of a live PTV stream should commence at the at least one other video communication device.

14. The video communication device of claim 10, wherein the electronic processor is configured to:
truncate the pre-buffered video prior to selecting the first set of video segments by discarding one or more video segments of the pre-buffered video that precede the video segment in which the objects of interest appeared for the first time within the pre-buffered video.

15. The video communication device of claim 10, wherein the electronic processor is configured to:
embed metadata in the time-compressed preview of the pre-buffered video, the metadata including instructions for the at least one other video communication device to highlight an identified one of the objects of interest during playback of the time-compressed preview of the pre-buffered video, the buffered PTV stream, and the live PTV stream at the at least one other video communication device.

16. The video communication device of claim 15, wherein the metadata further includes instructions for the at least one other video communication device to place a snapshot of the identified one of the objects of interest on a playback interface during playback of the live PTV stream at the at least one other video communication device.

17. The video communication device of claim 10, wherein the at least one video other communication device includes a second video communication device associated with a first user role and a third video communication device associated with a second user role, wherein the electronic processor is configured to:
determine that a first object of the objects of interest is relevant to the first user role and a second object of the objects of interest is relevant to the second user role; and
embed a first metadata and a second metadata in the time-compressed preview of the pre-buffered video, the first metadata including instructions for the second video communication device to highlight the first object during playback of the time-compressed preview of the pre-buffered video, the buffered PTV stream, and the live PTV stream at the second video communication device, and the second metadata including instructions for the third video communication device to highlight the second object during playback of the time-compressed preview of the pre-buffered video, the buffered PTV stream, and the live PTV stream at the third video communication device.

18. The video communication device of claim 17, further comprising:
an electronic display displaying a graphical user interface indicating that the first object is relevant to the first user role and the second object is relevant to the second user role, wherein the electronic processor is configured to detect, during transmission of the live PTV stream during the PTV communication session, a user input indicating that the first object is also relevant to the second user role, and responsively modify the second metadata including instructions for the third video communication device to highlight both the first and second objects during playback of the live PTV stream at the third video communication device.

19. A method of providing a time-compressed preview of a pre-buffered video during a push-to-video (PTV) communication session, the method comprising:
receiving, at a second video communication device, during a PTV communication session with a first video communication device, a first video stream representing a pre-buffered video and a second video stream representing a live PTV stream, wherein the pre-buffered video represents a most recent video that was recorded at the first video communication device for a predetermined time duration immediately preceding a detection of a PTV activation command at the first video communication device;
analyzing, at the second video communication device, the pre-buffered video to detect one or more objects of interest;
selecting, at the second video communication device, from the pre-buffered video, a first set of video segments including a video segment in which the objects of interest appeared within the pre-buffered video;
time-compressing, at the second video communication device, the pre-buffered video to generate a time-compressed preview of the pre-buffered video including the first set of video segments configured to be played at a first playback speed rate and a second set of video segments configured to be played at a second playback speed rate, the second set of video segments including one or more video segments from the pre-buffered video other than the first set of video segments, wherein the second playback speed rate is greater than the first playback speed rate;
playing, at the second video communication device, the time-compressed preview of the pre-buffered video while simultaneously buffering a received live PTV stream until a time at which the synchronous playback of the live PTV stream received from the first video communication device during the PTV communication session should be commenced at the second video communication device;
determining that the playback of the time-compressed preview of the pre-buffered video is completed, and responsively playing, at the second video communication device, a time-compressed version of the buffered live PTV stream; and
determining that the playback of the time-compressed version of the buffered live PTV stream is completed, and responsively synchronously playing, at the second video communication device, a live PTV stream received from the first video communication device.

20. The method of claim 19, wherein the time-compressed version of the buffered PTV stream is generated by time-compressing the buffered live PTV stream based on a compression factor that is determined as a function of a time duration taken to receive the entire portion of the pre-buffered video, a playback duration of the time-compressed preview of the pre-buffered video, and a time at which the live PTV stream will be synchronously played at the second video communication device.

* * * * *